US007055707B2

(12) United States Patent
Yoneyama et al.

(10) Patent No.: US 7,055,707 B2
(45) Date of Patent: Jun. 6, 2006

(54) PEELABLY LAMINATED BLOW-MOLDED CONTAINERS

(75) Inventors: Masashi Yoneyama, Matsudo (JP); Hiroyuki Nakamura, Koto-ku (JP); Masato Seguchi, Buzen (JP); Takayuki Goto, Koto-ku (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 174 days.

(21) Appl. No.: 10/432,873

(22) PCT Filed: Oct. 30, 2002

(86) PCT No.: PCT/JP02/11277

§ 371 (c)(1),
(2), (4) Date: Jul. 11, 2003

(87) PCT Pub. No.: WO03/037725

PCT Pub. Date: Aug. 5, 2003

(65) Prior Publication Data
US 2004/0069735 A1    Apr. 15, 2004

(30) Foreign Application Priority Data
Oct. 31, 2001 (JP) .............................. 2001-335630
Oct. 31, 2001 (JP) .............................. 2001-335633

(51) Int. Cl.
B65D 23/02 (2006.01)
A47J 41/02 (2006.01)

(52) U.S. Cl. ..................... 215/12.1; 215/385; 215/902; 220/495.04; 220/676; 220/723; 220/913

(58) Field of Classification Search ............... 215/12.1, 215/12.2, 381, 900, 385, 902; 220/666, 495.04, 220/676, 723, 913
See application file for complete search history.

(56) References Cited

U.S. PATENT DOCUMENTS 5,435,452 A * 7/1995 Nishigami et al. ......... 215/12.1
6,670,007 B1 * 12/2003 Safian et al. ............. 428/36.91

FOREIGN PATENT DOCUMENTS

| JP | A 8-26241   | 1/1996 |
| JP | A 8-216238  | 8/1996 |
| JP | A 9-77136   | 3/1997 |
| JP | A 2000-16469 | 1/2000 |

* cited by examiner

Primary Examiner—Sue A. Weaver
(74) Attorney, Agent, or Firm—Oliff & Berridge, PLC

(57) ABSTRACT

A blow-molded container includes an outer layer of a synthetic resin, which forms the outer shell of a finite shape; an inner layer of a flexible synthetic resin, which is peelably laminated with the outer layer and forms an inner bag; and a pair of adhered zones of a vertical strip type, which is formed axisymmetrically on the central axis of container to adhere and fix the outer layer and the inner layer over the entire height and is located so as to avoid the positions of air introduction ports that have been provided in the outer layer to introduce air into the void between the outer layer and the inner layer. A pair of adhered zones is disposed at positions opposite to each other and is separated by a parting line. The lower ends of both adhered zones are disposed at the partly or wholly end-to-end position facing each other on the bottom seal formed when the bottom portion is pressed flat with the pinch-off of a blow mold. Because of this end-to-end facing position of the lower ends, the bottom seal has a full mechanical strength. Thus, there is provided a container of the delaminated type capable of molding by means of an ordinary mold and having high manufacturing efficiency.

9 Claims, 14 Drawing Sheets

PEELABLY LAMINATED BLOW-MOLDED CONTAINERS

TECHNICAL FIELD

This invention relates to a peelably laminated, blow-molded container made of synthetic resins, which is obtained by peelably laminating an outer layer that forms an outer shell of a definite shape and an inner layer that forms a deformable inner bag, so that the content can be discharged and used without changing the outer appearance of this container.

BACKGROUND ART

Peelably laminated containers made of synthetic resins are known and obtained by peelably laminating an outer layer that forms an outer shell of a finite shape and an inner layer that forms a deformable inner bag. These blow-molded bottles are generally referred to as delaminated bottles.

An outer parison and an inner parison having no compatibility with each other are first extruded together to give a laminated parison. This laminated parison is then blow-molded into the peelably laminated synthetic resin container by using a split mold for blow molding. At that time, the bottom portion is pinched with the pinch-off of the blow mold and is pressed flat to form a bottom seal. Since the bottom seal has basically a laminated structure consisting of the outer layer and the inner layer, which are not compatible with each other, there was dissatisfaction in that the outer layer is easily cracked at the bottom.

As a conventional art to relieve this dissatisfaction, there is Japanese Laid-Open Patent Application No. 1996-216238. In the configuration of that invention, the bottom portion is pinched with the pinch-off of the blow mold and is pressed flat to form the bottom seal, as described above, but the seal is overlaid with a pair of ribs and pressed together so that a ridge is formed along the parting line. Some interlocks are provided at several points along the seal as both ribs bite into each other.

In this conventional art, the bottom seal is formed into a ridge having a certain height and width. As a result, the bottom seal has a large area of pressed contact between the outer layer and the inner layer. The interlocks provided at several points not only increase the area of pressed contact further, but also increase resistance to the shearing force that is parallel to the plane of pressed contact, thereby making it possible to obtain a bottom seal having a mechanical strength that is high enough to prevent the bottom seal from cracking.

However, in the above-described conventional art, there are cases of cracking in the bottom seal because of the effect of time-lapsed shrinkage at the bottom, which takes place after the containers have been blow-molded. The problem of bottom cracking is often found especially in large-size containers of this conventional art when they are dropped onto the floor or when they experience a shock.

Therefore, the blow-molded containers of this kind are required to go through complete cool-down and shrinkage within the mold. A problem arises here because the bottom seal has large height, thickness, and cubic volume, which need long hours of cooling and thus result in quite low efficiency in the production of containers.

This invention has been made to solve the above-described problem. The technical problem of this invention is to achieve strong adhesion between the outer layers at the bottom seal without increasing the bulk of the bottom seal.

The object of this invention is to provide a peelably laminated, blow-molded synthetic resin container having higher strength and greater economic efficiency at higher manufacturing efficiency than ever, without causing a decrease in the ability of the container to sit on the bottom.

DISCLOSURE OF THE INVENTION

Among the means of solving the above-described technical problem, the means of carrying out the invention of claim 1 has the following configuration. The peelably laminated, blow-molded synthetic resin container comprises an outer layer of a synthetic resin, which forms the outer shell of a finite shape; an inner layer of a flexible synthetic resin, which can be peelably laminated with the outer layer and forms an inner bag; and a pair of adhered zones of a vertical strip type, which is formed axisymmetrically on the central axis of container to adhere and fix the outer layer and the inner layer over the entire height and is located so as to avoid the positions of air introduction ports that have been provided in the outer layer to introduce air into the void between the outer layer and the inner layer. In this configuration the pair of adhered zones is provided at positions opposite to each other and is separated by the parting line. The lower ends of both adhered zones are disposed at a partly or wholly end-to-end position facing each other on the bottom seal formed when the bottom portion of the container is pressed flat with the pinch-off of a blow mold.

In the configuration of claim 1, the container is blow-molded in a blow mold having an ordinary pinch-off structure, i.e., a split mold for blow molding. The bottom seal is thus the pinch-off portion formed at the bottom. Similarly as in ordinary blow moldings, the seal is a ridge with a low protrusion Since the bottom seal of this container has as fully small a cubic volume as in ordinary blow-molded containers, the seal portion can be cooled down quickly and sufficiently before the container is released from the mold.

Both adhered zones have their lower ends in the bottom seal. In this seal portion where the lower ends are positioned, the outer layer is firmly adhered and fixed to the inner layer over the total length of these lower end widths.

Here, the lower ends of both adhered zones are disposed at the end-to-end position facing each other at the bottom seal. The outer layers and the inner layers are fixed to each other, with the deformation caused by an external force being restricted, over the entire range from side to side across both adhered zones in the center of the bottom seal.

Thus, both ends of the bottom seal and the above described fixed portion in the center of the bottom seal serve as the junctions against the deformation of the laminated bottom seal. Individual deformation of the outer layer and the inner layer is inhibited also in the rest of the bottom seal where there is no adhered zone. As a result, even if any force is applied on the bottom seal, the seal is able to resist the force and is protected securely against cracking.

The means of carrying out the invention of claim 2 comprises that, in the invention of claim 1, the lower ends of both adhered zones are dislocated from each other to such a degree that corresponding portions of the inner layer are not flexibly deformed.

In the configuration of claim 2, the lower ends of both adhered zones are dislocated from each other to such a degree that corresponding portions of the inner layers are not flexibly deformed, as describe above. Because of this dislocation at the bottom seal, the outer layer and the inner layer are adhered and fixed to each other by the adhered zones over the entire range from side to side across both adhered zones in the center of the bottom seal so that the bottom seal can be adhered and fixed over a wide range.

The three points, i.e., both ends of the bottom seal and the above-described adhered and fixed portion, serve as the junctions against the deformation of the laminated bottom seal. Individual deformation of the outer layer and the inner layer is inhibited also in the rest of the bottom seal other than the adhered and fixed portion. As a result, even if any force is applied on the bottom seal, the seal is able to resist the force and is protected against cracking. Since the adhered and fixed portion occupies a wide range of the seal, this portion securely serves as a junction together with both ends of the seal, and effectively inhibits the individual deformation of the outer layer and the inner layer. Thus, sufficient crack-preventing effect can be obtained.

The lower ends of the bottom seal need not be located at a an end-to-end position partly facing each other, but can be dislocated from each other to such a degree that corresponding portions of the inner layers are not flexibly deformed.

If the lower ends of both adhered zones were dislocated from each other along the bottom seal within a range that corresponding portions of the inner layers were not flexibly deformed, then the portion of the inner layers between both lower ends would not be flexibly deformed. It turns out, therefore, that one portion adhered and fixed by an adhered zone is almost firmly connected to the other portion through this portion of inner layers. Due to this connection, the bottom seal portions adhered and fixed with the adhered zones keep a stable, definite posture without making these portions deformed in vain.

If the lower ends of both adhered zones on the bottom seal were dislocated from each other to an expanded degree, then it would be easy to deform flexibly the portion of inner layers lying sandwiched by the adhered zones. In that case, it would become impossible to have a firm bond that connects this portion of inner layers with the adhered zones on both sides. The bottom seal would also have an unstable sitting posture.

The means of carrying out the invention of claim 3 comprises that, in the invention of claim 1, one lower end of an adhered zone is disposed on the bottom seal at the wholly end-to-end position facing the other lower end of the corresponding adhered zone.

In the configuration of claim 3, the two adhered zones are disposed at positions opposite to each other and are separated by the parting line. The lower ends of both adhered zones are disposed on the bottom seal at the wholly end-to-end position facing. At this wholly end-to-end facing position, the outer layers on both sides of the parting line and the inner layer sandwiched by these outer layers are strongly adhered and fixed by these adhered zones over the entire width of the lower end of each adhered zone.

As described above, the inner and outer layers form a strongly adhered portion. Thus, the three points, i.e., both ends of the bottom seal and the above-described adhered portion, serve as the junctions against the deformation of the laminated bottom seal. Individual deformation of the outer layer and the inner layer is inhibited also in the rest of the bottom seal where there is no adhered zone. As a result, even if any force is applied on the bottom seal, the seal is able to resist the force and is protected securely against cracking.

The adhered zones are located roughly at axisymmetrical positions over the entire height of the body to perform a restrictive function against deflationary deformation of the inner layer. The adhered zones create a symmetrical pair of unadhering portions of the inner layer (hereinafter referred to as unadhering inner layers). It has been made possible to proceed with the deflationary deformation of the unadhering inner layers in a symmetrical pattern and to achieve smooth discharge of the contact.

The means of carrying out the invention of claim 4 comprises that, in the invention of claim 1, 2, or 3, the adhered zones are disposed, axisymmetrically on the central axis of the container, at positions dislocated from the parting line by a central angle of roughly 90 degrees.

In the configuration of the invention of claim 4, the adhered zones are located roughly at the center of the bottom seal length. This central portion most effectively serves as the junction to inhibit individual deformation of the outer layers and the inner layers more effectively than ever and to prevent the bottom seal from cracking to a larger extent.

The invention of claim 5 comprises that, in the invention of claim 1, 2, 3 or 4, the air introduction ports are disposed, axisymmetrically on the central axis, at two points in the outer layers near the parting line.

In the configuration of the invention of claim 5, outside air comes in through the air introduction ports provided near the parting line. Because of these port positions, it has become possible to proceed with the deflationary deformation of the unadhering inner layers in the symmetrical pattern and to achieve smooth discharge of the content.

The invention of claim 6 comprises that, in the invention of claim 1, 2, 3, 4, or 5, the air introduction ports are provided in the neck portions of the outer layers.

In the invention of claim 6, the air introduction ports are provided at the neck, which is covered by cap. These ports therefore do not spoil the container appearance. When the ports are cut off in the after processing, the ports can be drilled easily without piercing the inner bag, because the inner layer is considerably thick at the neck portion.

PREFERRED EMBODIMENTS OF THE INVENTION

Figure 1:
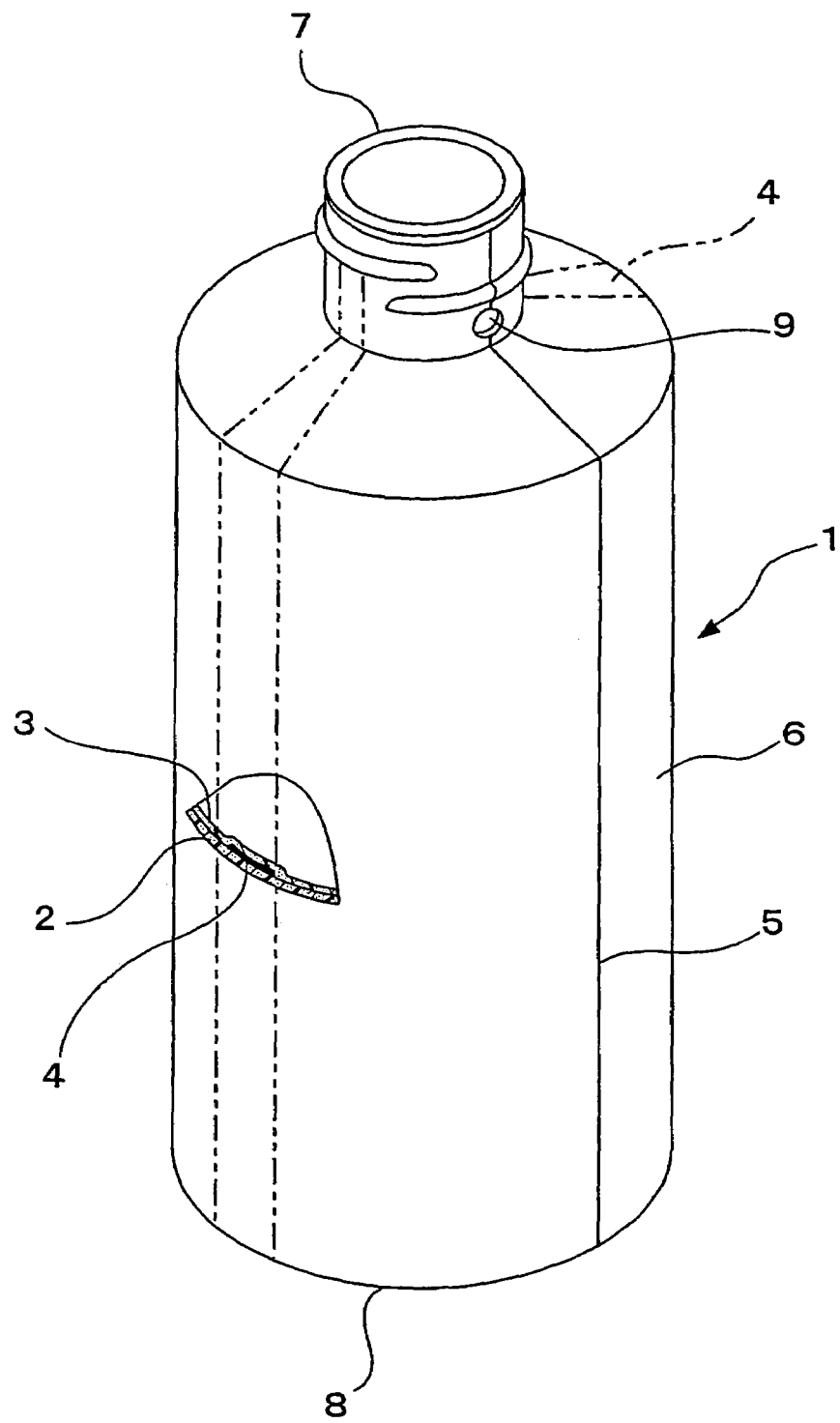
FIG. 1 is an overall perspective view with a partial insection showing the container in the first embodiment of this invention.
Figure 2:
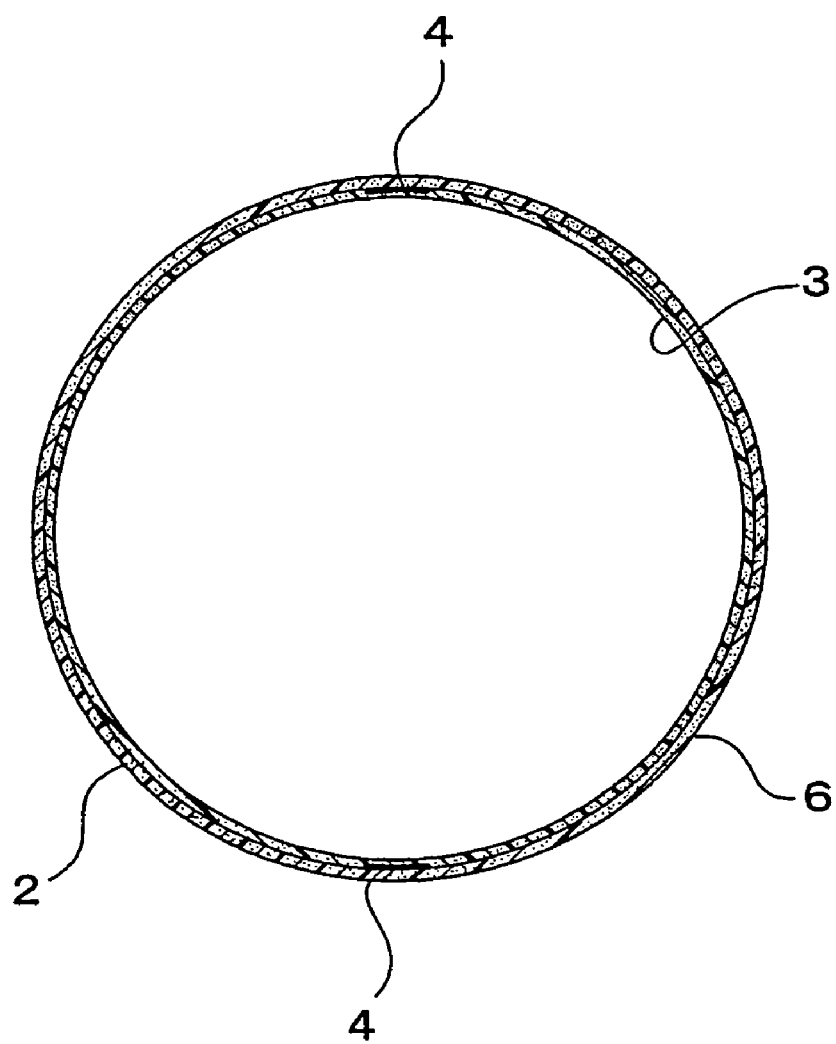
FIG. 2 is a cross-sectional plan view of the embodiment shown in FIG. 1.

This invention is further described with respect to preferred embodiments, now referring to the drawings.

FIGS. 1–5 show the first embodiment of the container 1 according to this invention. The container 1 is a blow-molded container comprising an outer layer 2 of a synthetic resin, such as polyethylene and polypropylene, which forms an outer shell having a necessary ability to maintain the shape of its own; an inner layer 3, which is molded into a flexibly deformable bag and is made of such a resin as nylon, ethylene-vinyl-alcohol copolymer, and polyethylene terephthalate, having no compatibility with the material of the outer layer 2; and a pair of adhered zones 4 of a vertical strip type, which is disposed over the entire height of the container 1 and is made of an adhesive resin that has full adhesiveness with both of the outer layer 2 and the inner layer 3.

This container 1 has a circular body 6. The neck 7 is disposed standing from the upper end of the body 6, and has screw thread notched around the outer surface of this neck 7. The neck 7 is provided with a pair of air introduction ports 9, which is disposed at two points on the right and left sides, so as to introduce air into the void between the outer layer 2 and the inner layer 3. Both adhered zones 4 are dislocated from the positions of the air introduction ports 9 by a central angle of about 90 degrees. At the lower end of the body 6 there is bottom 8 having an upward arched bottom wall.

Figure 3:
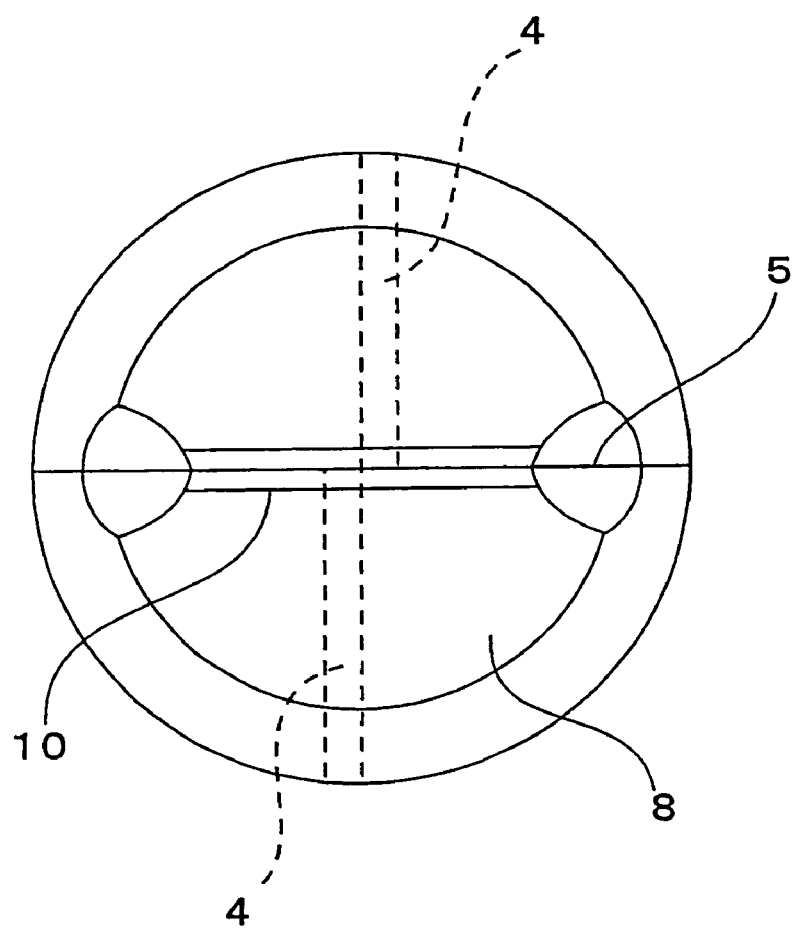
FIG. 3 is a bottom plan view of the embodiment shown in FIG. 1.
Figure 4:
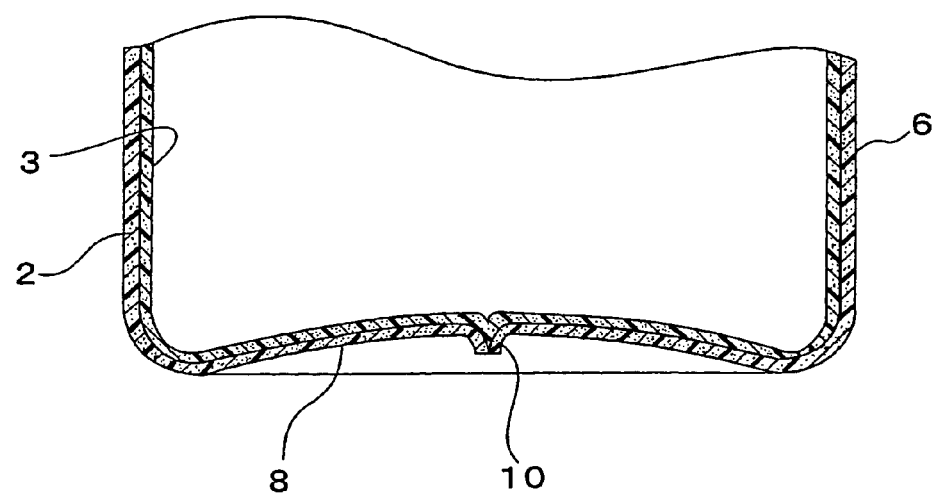
FIG. 4 is an enlarged longitudinal section of the bottom portion in the embodiment shown in FIG. 1.

As seen in FIGS. 3 and 4, the bottom 8 has foot of the container 1 on the periphery of the bottom wall. Bottom seal 10 is provided on the parting line 5 in the central part of the bottom wall, roughly crossing the bottom wall. The seal 10 has been formed when the bottom portion was pinched off with the pinch-off of the blow mold.

Parison is obtained by extruding together the outer cylinder to make the outer layer 2, the inner cylinder located inside the outer cylinder to make the inner layer 3, and a pair of adhered zones 4 of the vertical strip type positioned axisymmetrically on the central axis, with adhesive resine strip being sandwiched between the outer cylinder and the inner cylinder. This parison is then blow-molded into the container 1, by using a split mold for blow molding.

Figure 5:
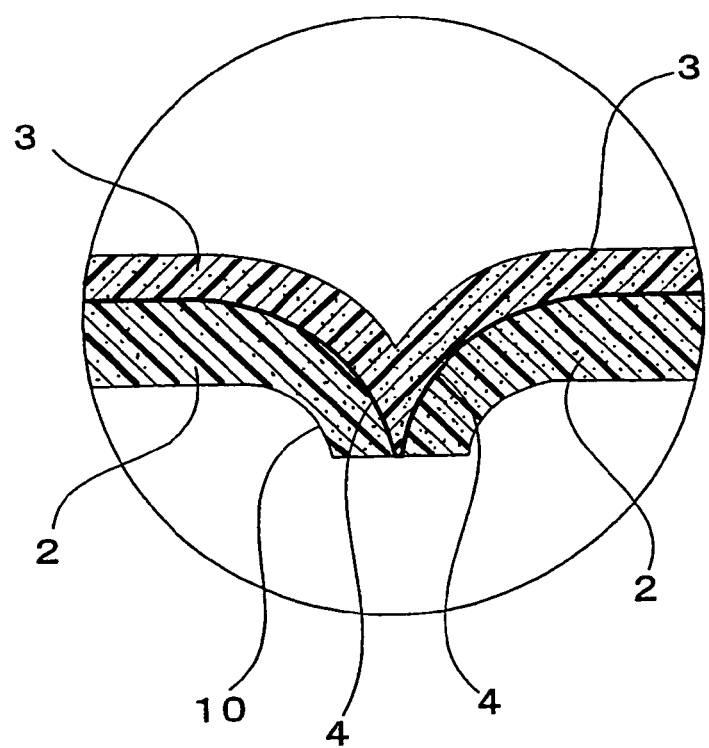
FIG. 5 is an enlarged view of the bottom seal shown in FIG. 4.

When the container 1 is blow-molded, the parison is set in the split blow mold at such a posture that a pair of adhered zones 4 is put in the mold clamping direction taken from the central axis of the parison. As shown in FIG. 3, both adhered zones 4 reach the bottom seal 10 located on the parting line 5 of the bottom 8. Thus, as shown in FIGS. 4 and 5, the adhered zones 4 strongly adhere and fix the outer layer 2 and the inner layer 3 to each other in the central part of the pinched bottom seal 10, where both adhered zones 4 are located.

In the first embodiment shown in FIG. 3, both adhered zones 4 are dislocated from each other to take the side-by-side positions along the bottom seal 10. Because of this dislocation, portions of the outer layer 2 and portions of the inner layer 3, which are made firm against each other, have a total width twice as long as the width of each adhered zone 4.

Figure 6:
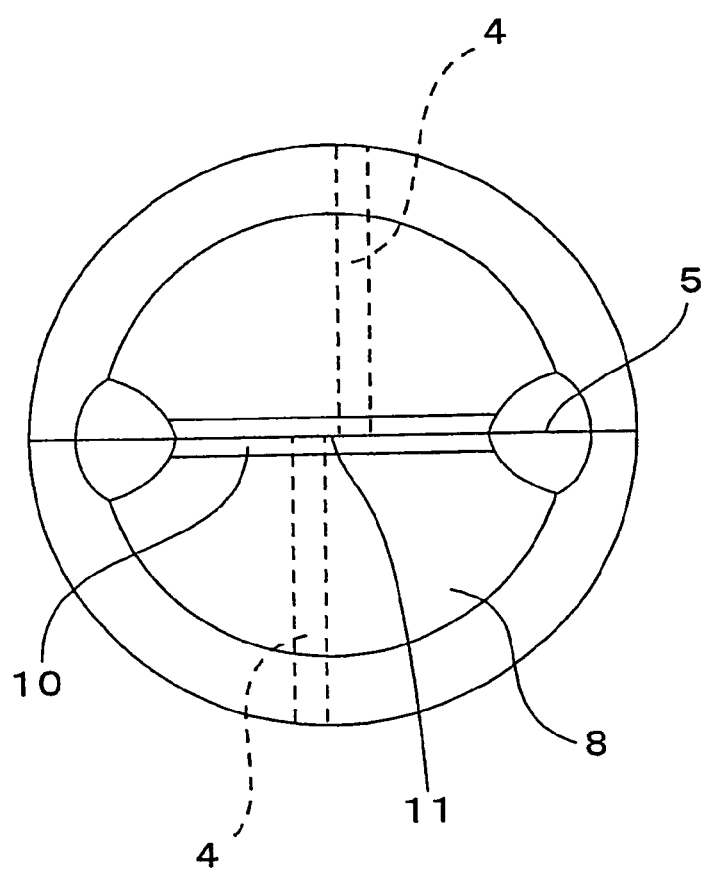
FIG. 6 is a bottom plan view of the container in the second embodiment of this invention.
Figure 7:
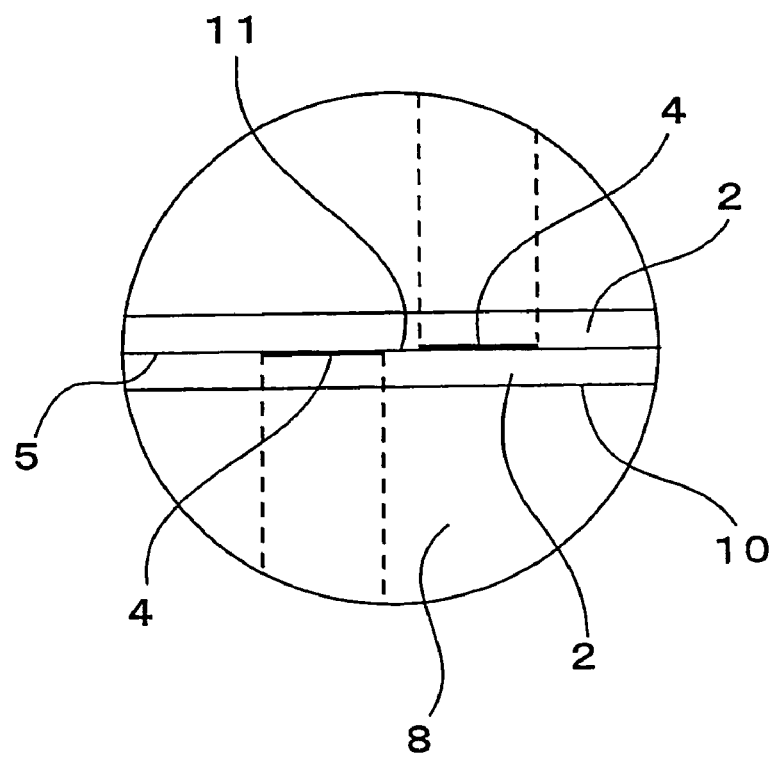
FIG. 7 is an enlarged view of the bottom seal shown in FIG. 6.
Figure 8:
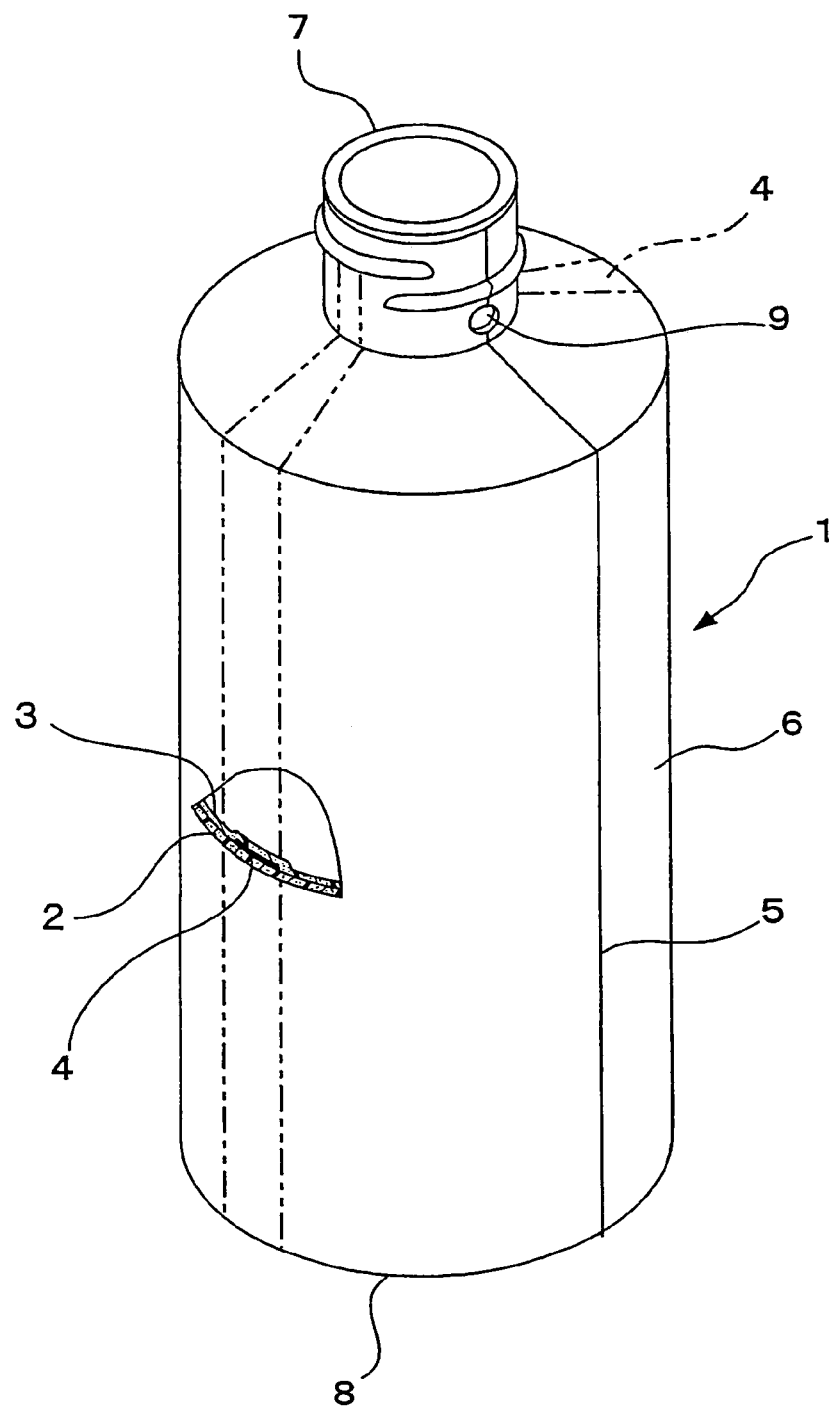
FIG. 8 is an overall perspective view with a partial insection showing the container in the third embodiment of this invention.
Figure 9:
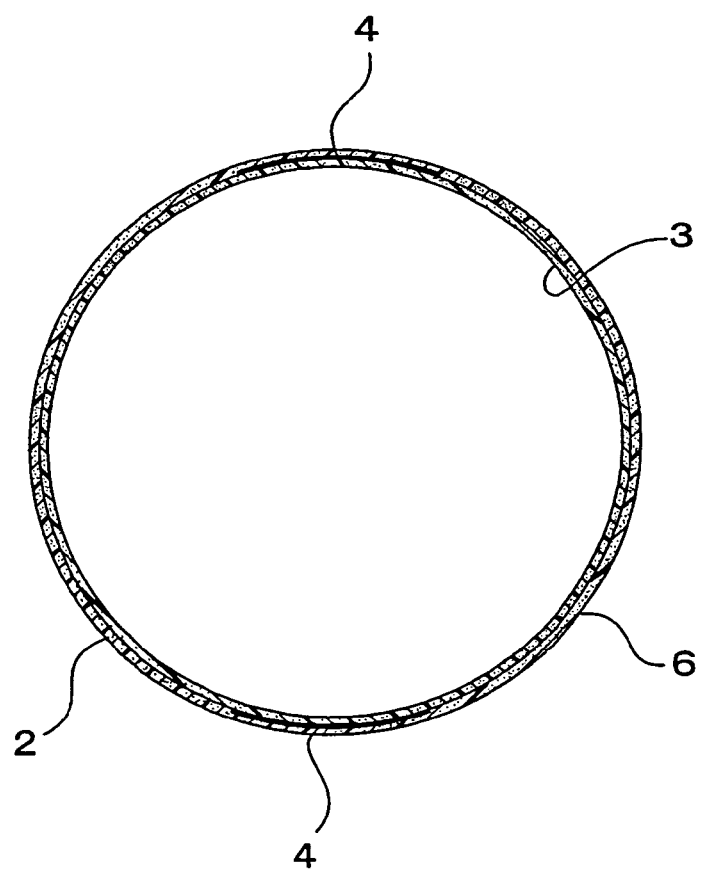
FIG. 9 is a cross-sectional plan view of the embodiment shown in FIG. 8.

In the second embodiment shown in FIGS. 6 and 7, both adhered zones 4 are dislocated from each other along the bottom seal 10 to such a degree that an inner-layer portion 11 sandwiched between the lower ends of both adhered zones 4 is not flexibly deformed. Since this inner-layer portion 11 has little flexible deformation, those portions adhered and fixed along the bottom seal 10 respectively by each adhered zone 4 are almost integrally interconnected because of this inner-layer portion 11 that is hardly deformed flexibly.

It should be noted that each air introduction port 9 is in a position equidistant from both adhered zones 4 along the circumferential direction. In principle, it is advantageous for the air introduction ports 9 to be located on the parting line 5 so that the inner layer 3 can be deflated and deformed smoothly and efficiently.

FIGS. 8–14 show the third embodiment of the container 1 according to this invention. The container 1 is a blow-molded container comprising an outer layer 2 of a synthetic resin, such as polyethylene and polypropylene, which forms an outer shell having a necessary ability to maintain the shape of its own; an inner layer 3, which is molded into a flexibly deformable bag and is made of such a resin as nylon, ethylene-vinyl-alcohol copolymer, and polyethylene terephthalate, having no compatibility with the material of the outer layer 2; and a pair of adhered zones 4 of a vertical strip type, which is disposed over the entire height of the container 1 and is made of an adhesive resin that has full adhesiveness with both of the outer layer 2 and the inner layer 3.

This container 1 has a circular body 6. The neck 7 is disposed standing from the upper end of the body 6, and has screw thread notched around the outer surface of this neck 7. The neck 7 is provided with a pair of air introduction ports 9, which is disposed at two points in the outer layers on the right and left parting lines 5, so as to introduce air into the void between the outer layer 2 and the inner layer 3.

Both adhered zones 4 are dislocated from the parting line 5 by a central angle of about 90 degrees.

Figure 10:
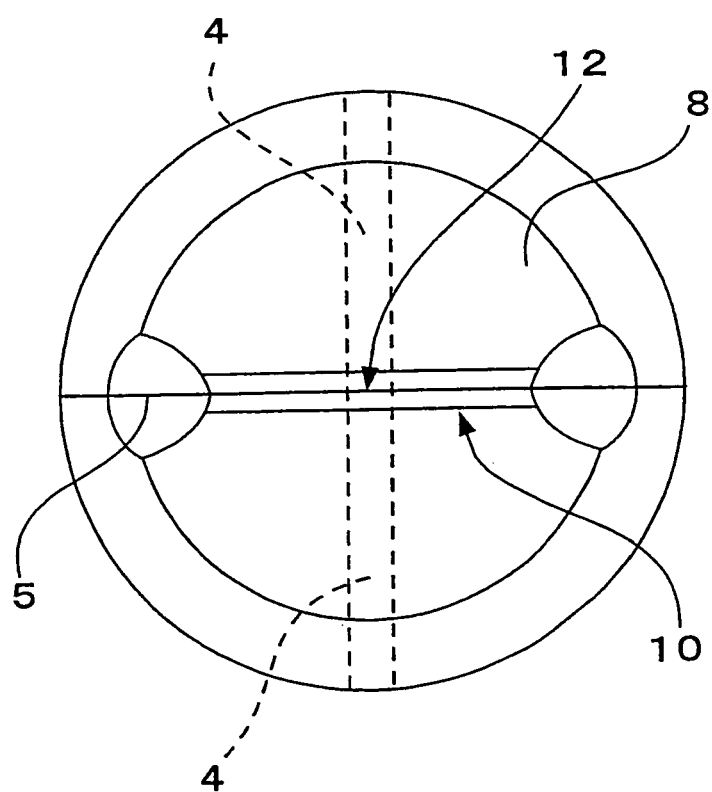
FIG. 10 is a bottom plan view of the embodiment shown in FIG. 8.
Figure 11:
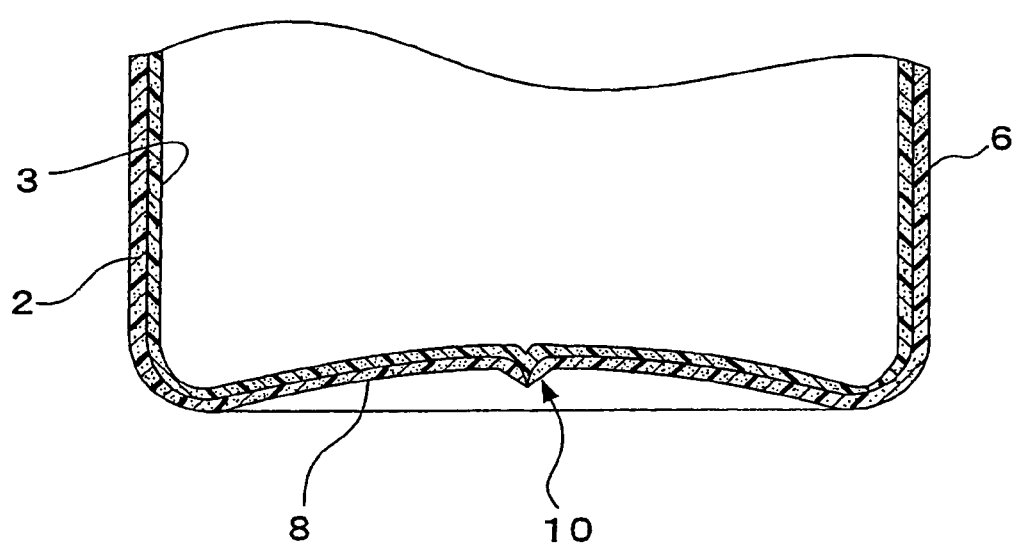
FIG. 11 is an enlarged longitudinal section of the bottom portion in the embodiment shown in FIG. 8.

At the lower end of the body 6 there is the bottom 8 having an upward arched bottom wall. As seen in FIGS. 10 and 11, the bottom 8 has foot of the container 1 on the periphery of the bottom wall. Bottom seal 10 is provided on the parting line 5 in the central part of the bottom wall, roughly crossing the bottom wall. The bottom seal 10 has been formed when the bottom portion was pinched off with the pinch-off of the blow mold.

Parison is obtained by extruding together the outer cylinder to make the outer layer 2, the inner cylinder located inside the outer cylinder to make the inner layer 3, and a pair of adhered zones 4 of the vertical strip type positioned axisymmetrically on the central axis, with adhesive resine strip being sandwiched between the outer cylinder and the inner cylinder. This parison is then blow-molded into the container 1, by using a split mold for blow molding.

When the container 1 is blow-molded, the parison is set in the split blow mold at such a posture that a pair of adhered zones 4 is put in the mold clamping direction taken from the central axis of the parison. As shown in FIG. 10, both adhered zones 4 reach the bottom seal 10 located on the parting line 5 of the bottom 8.

The two adhered zones 4 are separated by the parting line 5 and are located opposite to each other. Thus, as shown in FIGS. 10 and 13, the lower ends of the adhered zones 4 are disposed at the wholly end-to-end position facing each other in the central part of the pinched bottom seal 10 (hereinafter the portion in the end-to-end relationship between both adhered zones is referred to as the "end-to-end facing portion 12").

Figure 12:
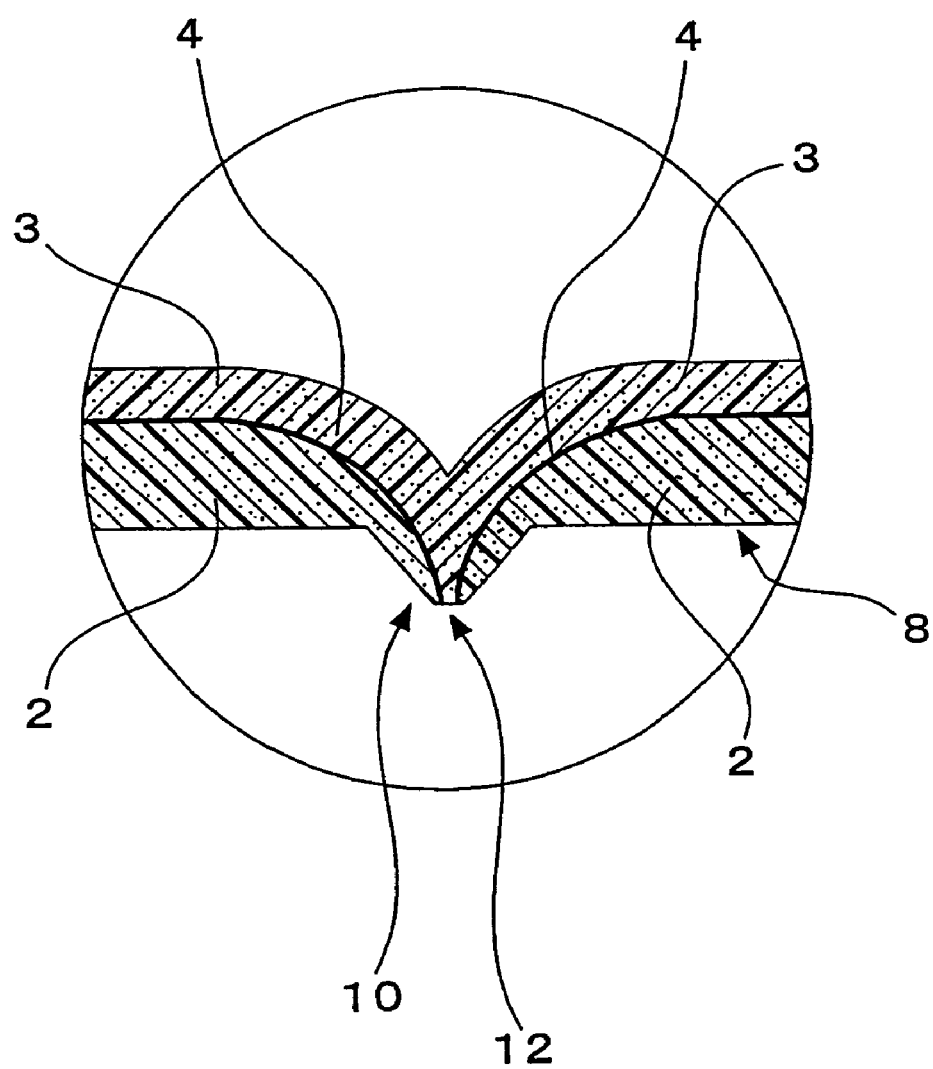
FIG. 12 is an enlarged view of the bottom seal of FIG. 11.
Figure 13:
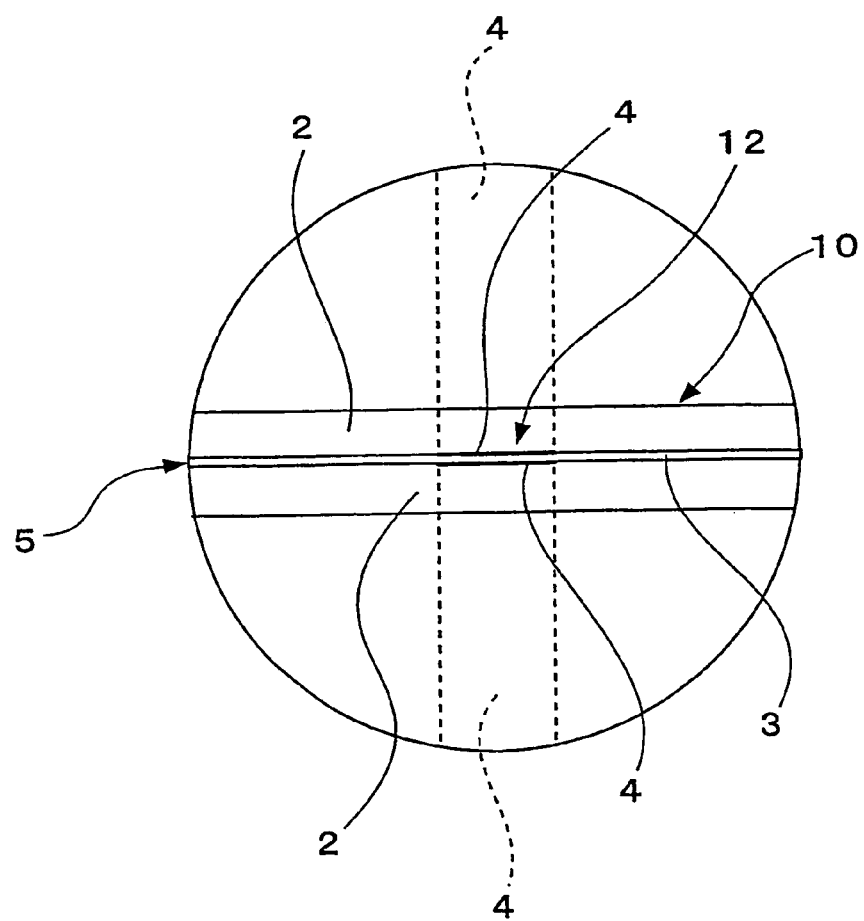
FIG. 13 is an enlarged view of the bottom seal shown in FIG. 10.
Figure 14:
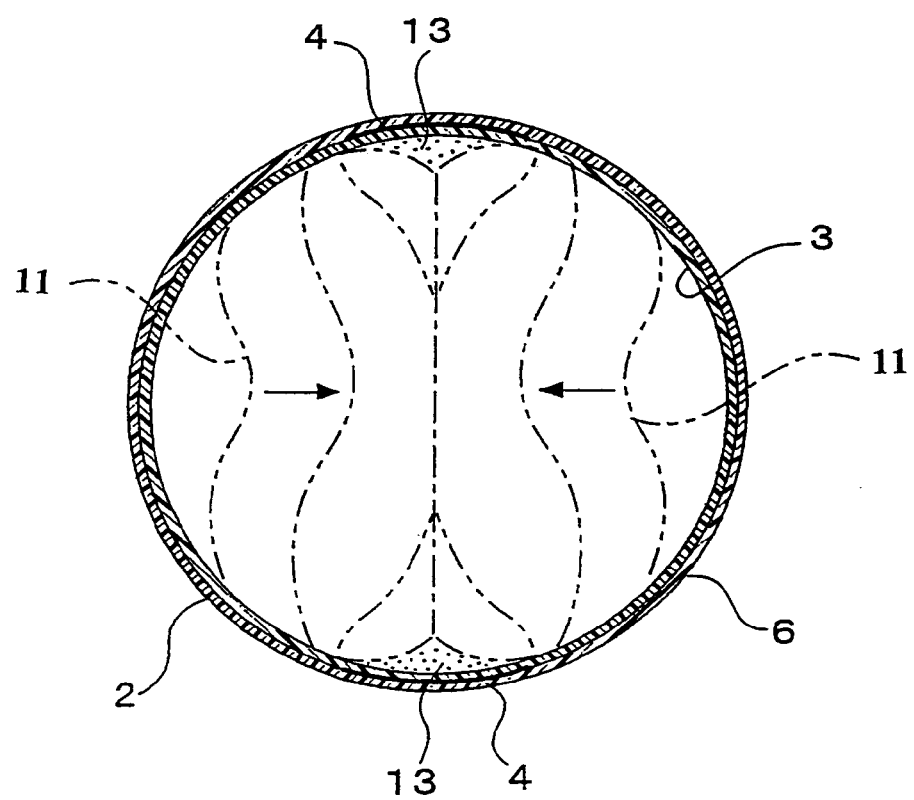
FIG. 14 is the same cross-sectional plan view as FIG. 9, which shows the trend in the deformation of the inner layers.

Therefore, as shown in FIGS. 12 and 13, the adhered zones 4 strongly adhere and fix the outer layers 2 on both sides of the parting line 5 to the inner layer 3 sandwiched by these outer layers 2, in this end-to-end facing portion 12 on the pinched bottom seal 10. Since this facing portion is located roughly at the center of the bottom seal 10, the individual deformation of the inner layer 3 or the outer layers 2 is inhibited over the entire bottom seal 10. Consequently, the bottom seal 10 can be prevented securely from cracking.

In the third embodiment, a pair of air introduction ports 9 is disposed at the neck, and is located axisymmetrically on the parting line 5. The deflationary deformation of the inner layers 3 is caused by a decrease in the inner pressure or a decrease in the content 13, and result in the changes in the two unadhering inner layers 11 that proceed in the symmetrical pattern. At that time, a pair of adhered zones 4, which has been dislocated from the parting line 5 by a central angle of about 90 degrees, performs the function to restrict the deformation. Thus, it is possible to secure the flow path and to maintain smooth discharge operation until the content 13 is totally consumed (See FIG. 14).

The first to third embodiments have a configuration that the two air introduction ports 9 are located at the neck 7 and are disposed axisymmetrically on the parting line 5. However, this invention is not limited to this arrangement, but the number and places of the air introduction ports can be selected, depending on the purpose of use and the level of difficulty in processing.

In the first to third embodiments, the container 1 has been described as having a two-layer structure consisting of the outer layer 2 and the inner layer 3. However, the inner layer 3 of this invention is not limited to a single-layer structure, but is fully acceptable as having a laminated structure. For instance, the two inner layers may comprise an outside synthetic resin layer having a peeling ability with the outer layer 2 and an inside layer of a synthetic resin having high resistance to the content.

EFFECTS OF THE INVENTION

This invention having the above-described configuration has the following effects.

The invention of claim 1 makes it possible to achieve the cooling of the container bottom seal quickly and sufficiently. Thus, the container production cycle can be improved to a level similar to the level achieved with ordinary blow-molded products.

There is no need of utilizing a special mold in which mold-cooling efficiency has to be taken into consideration. The plant and equipment cost can also be reduced drastically since ordinary molds can be used.

The outer layers and the inner layers of the bottom seal can be adhered and fixed to each other by the adhered zones in the width range larger than the width of each adhered zone. It is possible, therefore, to prevent the bottom securely and sufficiently from having a decreased mechanical strength that tends to result when the outer layer and the inner layer are formed peelably.

In the invention of claim 2, the outer layers and the inner layers of the bottom seal can be adhered and fixed to each other by the adhered zones in the width range larger than the width of each adhered zone. It is possible, therefore, to prevent the bottom securely and sufficiently from having a decreased mechanical strength that tends to result when the outer layer and the inner layer are formed peelably.

In the invention of claim 3, the outer layers and the inner layers of the bottom seal can be adhered and fixed strongly to each other by the adhered zones. It is possible, therefore, to prevent the bottom securely and sufficiently from having a decreased mechanical strength that tends to result when the outer layer and the inner layer are formed peelably.

In the invention of claim 4, the adhered zones are dislocated from the position of the parting line 5 by a central angle of about 90 degrees, as seen on the central axis of the container. Because of this angle, the adhered zones can be located at the center of the bottom seal length. Adhesion at the center of the bottom seal enables the bottom seal to be prevented from cracking as much as possible.

In the invention of claim 5, outside air comes in through the air introduction ports, which are disposed near the parting line. This makes it possible to proceed with the deflationary deformation of the unadhering inner layers in the symmetrical pattern and to achieve smooth discharge of the content.

In the invention of claim 6, the air introduction ports can be opened without giving adverse effects on the outer appearance of the container. These ports can be drilled safely and simply in the after processing.

The invention claimed is:

1. A blow-molded container, comprising:
   an outer layer of a synthetic resin, which forms the outer shell of a finite shape;
   an inner layer of a flexible synthetic resin, which is laminated with the outer layer in a peelable way and forms an inner bag; and
   a pair of adhered zones of a vertical strip type, which is formed axisymmetrically on the central axis of container to adhere and fix the outer layer and the inner layer over the entire height and is located so as to avoid the positions of air intake ports that have been provided in the outer layer to take air into the void between the outer layer and the inner layer, wherein:
   the pair of said adhered zones is disposed on the sides opposite to each other, with a parting line bordering between both sides, and at positions displaced on the central axis of said container by about 90 degrees from the direction of the parting line;
   lower ends of both adhered zones are opposed to each other at a partly or wholly end-to-end position on a bottom seal of a bottom portion of said container, said bottom seal being formed when the bottom portion of the container is pressed flat with a pinch-off section of a split mold used in blow molding; and
   said air intake ports are disposed almost axisymmetrically on the central axis of said container at two positions in the outer layer on or near the parting lines also located axisymmetrically on a neck of the container.

2. The blow-molded container according to claim 1, wherein the lower ends of both adhered zones are dislocated from each other until an inner layer portion is formed to such a degree this portion is not flexibly deformed even at a maximum dislocation.

3. The blow-molded container according to claim 2, wherein the adhered zones are disposed axisymmetrically on the central axis of the container at positions dislocated from the parting line by a central angle of roughly 90 degrees.

4. The blow-molded container according to claim 2, wherein the air intake ports define a pair of air introduction ports provided, axisymmetrically on the central axis of the container, at two points in the outer layer on or near the parting line.

5. The blow-molded container according to claim 2, wherein the air intake ports are provided in portions of the neck of the outer layer.

6. The blow-molded container according to claim 1, wherein the lower end of one adhered zone is disposed at the wholly end-to-end position facing the counterpart of the other adhered zone.

7. The blow-molded container according to claim 6, wherein the adhered zones are disposed axisymmetrically on the central axis of the container at positions dislocated from the parting line by a central angle of roughly 90 degrees.

8. The blow-molded container according to claim 6, wherein the air intake ports define a pair of air introduction ports provided, axisymmetrically on the central axis of the container, at two points in the outer layer on or near the parting line.

9. The blow-molded container according to claim 6, wherein the air intake ports are provided in portions of the neck of the outer layer.

* * * * *